United States Patent
Chu et al.

(10) Patent No.: US 8,692,505 B2
(45) Date of Patent: Apr. 8, 2014

(54) CHARGE APPARATUS

(75) Inventors: Mu-Tao Chu, Hsinchu (TW); Yu-Chen Yu, Taoyuan County (TW); Wen-Yung Yeh, Hsinchu County (TW); Wen-Yih Liao, Taichung (TW); Jui-Ying Lin, Taipei (TW); Ming-Hsien Wu, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 117 days.

(21) Appl. No.: 12/833,218

(22) Filed: Jul. 9, 2010

(65) Prior Publication Data

US 2011/0140540 A1    Jun. 16, 2011

(51) Int. Cl.
*H01M 10/44*    (2006.01)

(52) U.S. Cl.
USPC ........................................................ 320/101

(58) Field of Classification Search
USPC ........................................................ 320/101
See application file for complete search history.

(56) References Cited

U.S. PATENT DOCUMENTS

| | | | |
|---|---|---|---|
| 5,982,139 A | 11/1999 | Parise | |
| 6,567,002 B2 * | 5/2003 | Manneschi et al. | 340/572.1 |
| 6,949,909 B2 | 9/2005 | Chuang | |
| 6,967,462 B1 * | 11/2005 | Landis | 320/101 |
| 6,972,904 B2 | 12/2005 | Bratt et al. | |
| 6,994,448 B1 | 2/2006 | Gorrell | |
| 7,471,062 B2 | 12/2008 | Bruning | |
| 2003/0098057 A1 * | 5/2003 | Mizuno et al. | 136/244 |
| 2004/0142733 A1 * | 7/2004 | Parise | 455/572 |
| 2005/0062454 A1 * | 3/2005 | Raghunath et al. | 320/101 |
| 2006/0238365 A1 * | 10/2006 | Vecchione et al. | 320/138 |
| 2006/0266917 A1 * | 11/2006 | Baldis et al. | 250/200 |
| 2007/0019693 A1 | 1/2007 | Graham | |
| 2007/0114967 A1 | 5/2007 | Peng | |
| 2008/0236648 A1 * | 10/2008 | Klein et al. | 320/101 |
| 2010/0194335 A1 | 8/2010 | Kirby et al. | |
| 2010/0201189 A1 | 8/2010 | Kirby et al. | |
| 2010/0201201 A1 | 8/2010 | Mobarhan et al. | |
| 2010/0201202 A1 | 8/2010 | Kirby et al. | |

(Continued)

FOREIGN PATENT DOCUMENTS

| | | |
|---|---|---|
| TW | 533646 | 5/2003 |
| TW | M255370 | 1/2005 |
| TW | M317697 | 8/2007 |
| TW | 200931763 | 7/2009 |
| WO | 2007008646 | 1/2007 |
| WO | 2013052178 | 4/2013 |

OTHER PUBLICATIONS

"Office Action of Taiwan Counterpart Application", issued on May 3, 2011, p. 1-p. 9, in which the listed references were cited.

(Continued)

*Primary Examiner* — Edward Tso
*Assistant Examiner* — Robert Grant
(74) *Attorney, Agent, or Firm* — J.C. Patents (57) ABSTRACT

A charge apparatus including a natural energy conversion module, an energy converter, an energy transmitter, and an energy receiver is provided. The natural energy conversion module receives a natural energy and converts the natural energy into a first electric energy. The energy converter is electrically connected to the natural energy conversion module and converts the first electric energy into a wireless energy. The energy transmitter is electrically connected to the energy converter and transmits the wireless energy in a wireless manner. The energy receiver receives the wireless energy in a wireless manner and converts the wireless energy into a second electric energy.

19 Claims, 11 Drawing Sheets

(56) References Cited

U.S. PATENT DOCUMENTS

| | | |
|---|---|---|
| 2010/0201312 A1 | 8/2010 | Kirby et al. |
| 2010/0201314 A1 | 8/2010 | Toncich et al. |
| 2010/0207572 A1 | 8/2010 | Kirby et al. |
| 2010/0213895 A1 | 8/2010 | Keating et al. |
| 2010/0225272 A1 | 9/2010 | Kirby et al. |
| 2010/0253281 A1 | 10/2010 | Li |
| 2011/0030757 A1 | 2/2011 | Lin et al. |
| 2011/0115432 A1 | 5/2011 | El-Maleh et al. |
| 2011/0119144 A1 | 5/2011 | Grilli et al. |

OTHER PUBLICATIONS

Brown, "The History of Power Transmission by Radio Waves", IEEE Transactions on Microwave Theory and Techniques, vol. 32, Issue: 9, Sep. 1984, pp. 1230-1242.

Baarman, "Understanding Wireless Power", Dec. 2009, Fulton Innovation LLC, pp. 1-13.

Shinohara, "Wireless Power Transmission for Solar Power Satellite (SPS)", Space Solar Power Workshop, Georgia Institute of Technology, 2006, pp. 1-43.

\* cited by examiner

CHARGE APPARATUS

TECHNICAL FIELD

The disclosure relates to a charge apparatus, and more particularly, to an energy-converting charge apparatus.

BACKGROUND

In recent years, application of solar energy in energy generation has been increasing significantly. Solar panels are broadly deployed by various manufacturers to reduce the cost in power consumption and set up an environment-friendly manufacturing site. How to effectively convert a natural energy into electricity and store it has become one of the major subjects in today's energy and resources research. A light emitting device which uses solar energy as its power supply is disclosed in U.S. Pat. No. 6,994,448.

However, electric energy is the essential element for driving electronic devices and appliances. Conventionally, electric energy is generated by using thermal energy, hydraulic energy, or nuclear energy and then conducted to electronic devices and appliances to charge the same through transformers, power cables, and receptacles. Since the conventional technique for driving electronic devices and appliances depends on the contact between different elements, the charging effect may not be satisfactory due to oxidized contact points and sparks, electric shocks, power failures may be caused. In addition, different electronic devices and appliances require different power cables and charge apparatuses. Thus, the cables may be tangled together if different electronic products are used, and the working area of these electronic products may be limited by the position of the power source and the lengths of the cables.

Some wireless charging techniques have been developed in recent years. For example, an optical charge apparatus including a light source and a sensor connected to the light source is disclosed in U.S. Patent Publication 2007/0114967. When the sensor detects that a portable electronic apparatus having photovoltaic cells as its receiving device is getting close to the light source, the sensor controls the light source to emit light. The light emitted by the light source reaches the photovoltaic cells in the portable electronic apparatus to charge the portable electronic apparatus. However, because the photovoltaic cells are used as the receiving end of the energy transmission, this charge apparatus disclosed in the U. S. Patent Publication 2007/0114967 has a low photoelectric conversion rate therefore is not so practical.

A non-radiative energy wireless transmission technique is disclosed in PCT Publication WO 2007/008646 A2, wherein the energy is transmitted through resonance coupling between two resonance structure apparatuses.

Additionally, a wireless energy transmission system is disclosed in U.S. Patent Publication 2006/0266917, wherein an energy signal is issued and the position of an electronic product to be charged is determined at the receiving end through a reflection mechanism so as to charge the electronic product. A wireless charging system adaptable to a vehicle is disclosed in U.S. Pat. No. 5,982,139. When the wireless charging system receives a positioning signal of the vehicle, the wireless charging system charges the vehicle. The receiving end of the wireless charging system includes a logic circuit for detecting whether the electric volume of the vehicle reaches a charging standard. The wireless charging system can charge only one vehicle at one time.

In U.S. Patent Publication 2007/0019693, the position of an electronic product that is to be charged is determined through an image captured by a camera, and the electric volume of the electronic product is detected to determine whether to turn on a wireless energy transmission function. Furthermore, an optical receiver is disclosed in U.S. Pat. No. 6,972,904, wherein a diffractive optical element (DOE) is adopted for diffracting a light beam to a reflection plane, and the reflection plane is suitable for focusing the light beam into a specific direction.

SUMMARY

A charge apparatus is introduced herein.

The present disclosure provides a charge apparatus driven by a natural energy. The charge apparatus includes a natural energy conversion module, an energy converter, an energy transmitter, and an energy receiver. The natural energy conversion module receives a natural energy and converts the natural energy into a first electric energy. The energy converter is electrically connected to the natural energy conversion module and converts the first electric energy into a wireless energy. The energy transmitter is electrically connected to the energy converter and transmits the wireless energy in a wireless manner. The energy receiver receives the wireless energy in a wireless manner and converts the wireless energy into a second electric energy.

The present disclosure also provides another charge apparatus driven by a natural energy. The charge apparatus includes a natural energy conversion module, a light emitting device, and a photo detector. The natural energy conversion module receives a natural energy and converts the natural energy into a first electric energy. The light emitting device includes a directional light energy emitter. The light emitting device is connected to the natural energy conversion module, receives the first electric energy and converts the first electric energy into a laser light. The photo detector is disposed opposite to the light emitting device and converts the light source into a second electric energy.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
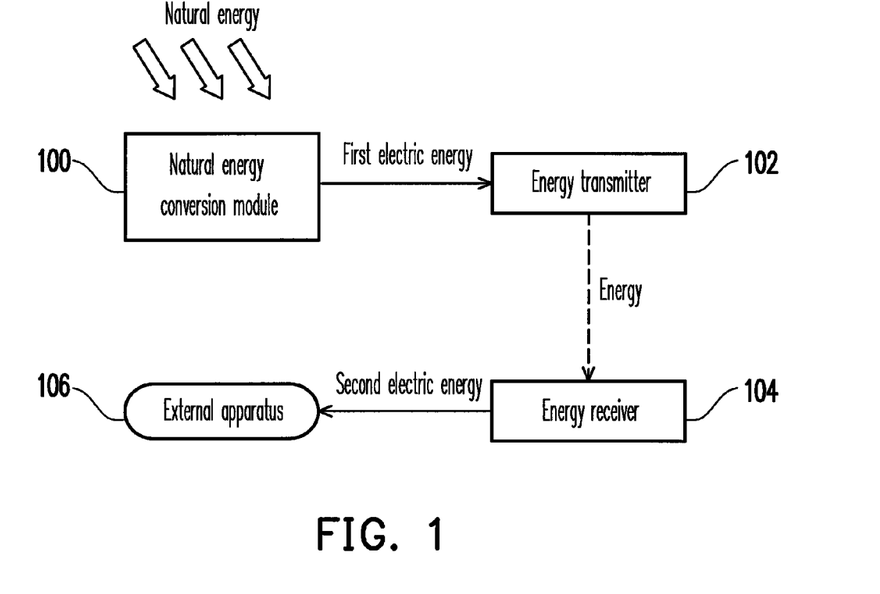
FIG. 1 is a block diagram illustrating a charge apparatus driven by a natural energy according to a first exemplary embodiment of the present disclosure.

FIG. 1 is a block diagram illustrating a charge apparatus driven by a natural energy according to a first exemplary embodiment of the present disclosure.

Referring to FIG. 1, the natural-energy-driven charge apparatus in the present embodiment includes a natural energy conversion module 100, an energy transmitter 102, and an energy receiver 104. The natural energy conversion module 100 receives a natural energy and converts it into a first electric energy. The energy transmitter 102 receives the first electric energy and converts it into an energy. The energy transmitter 102 may be a light emitting device or a radio wave transmitter. For example, the light emitting device may be a light emitting diode (LED), an incandescent, a laser diode, or other collimated light sources, and the radio wave transmitter may be a transmitting antenna that can convert the first electric energy into an electromagnetic wave and radiate it into the space. In addition, a sensor (not shown) may be disposed on the energy transmitter 102 for detecting the position of the energy receiver 104. When it is detected that the energy receiver 104 is getting close, the sensor drives the energy transmitter 102 to start working. The energy receiver 104 receives the energy and converts it into a second electric energy to be consumed by an external apparatus 106. The energy receiver 104 may be a photo detector or a radio wave receiver. For example, the photo detector may be a photovoltaic semiconductor, a photodiode, a phototransistor, or a photovoltaic cell. If the energy receiver 104 is a radio wave receiver, the energy receiver 104 is composed of a receiving antenna that receives the electromagnetic wave and converts it into the second electric energy. In addition, the natural-energy-driven charge apparatus may further include an electricity storage device (not shown) for storing the second electric energy. The energy transmitter 102 and the energy receiver 104 may be induction coils. Energy is transmitted between the energy transmitter 102 and the energy receiver 104 (as indicated by the dotted arrow in FIG. 1) without any conventional power cable. For example, if the energy transmitter 102 is a light emitting device, the light it generates can be transmitted to the energy receiver 104 through an optical fiber, and if the energy transmitter 102 is a radio wave transmitter, the electromagnetic wave it generates can be transmitted to the energy receiver 104 through waveguide (when the electromagnetic wave is a radio wave) or the air.

Figure 2:
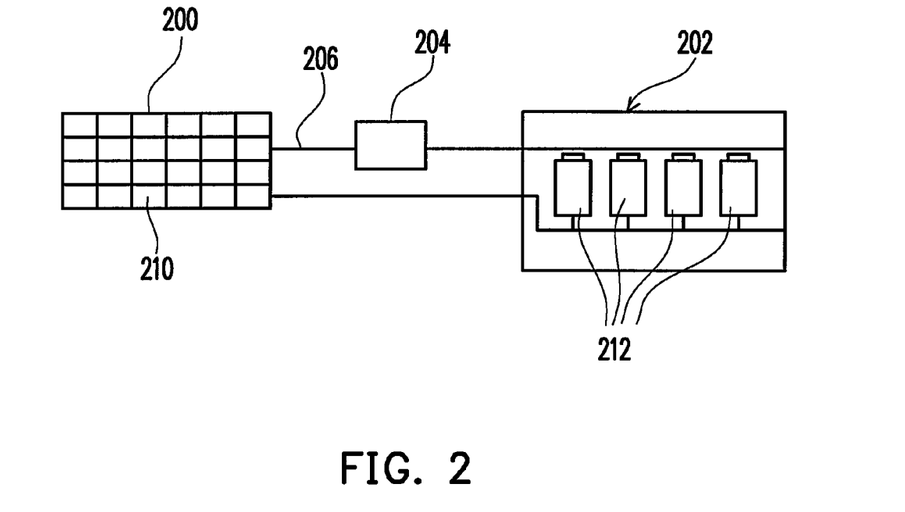
FIG. 2 is a block diagram illustrating a solar electricity generating apparatus applied to the charge apparatus in the first exemplary embodiment.
Figure 3:
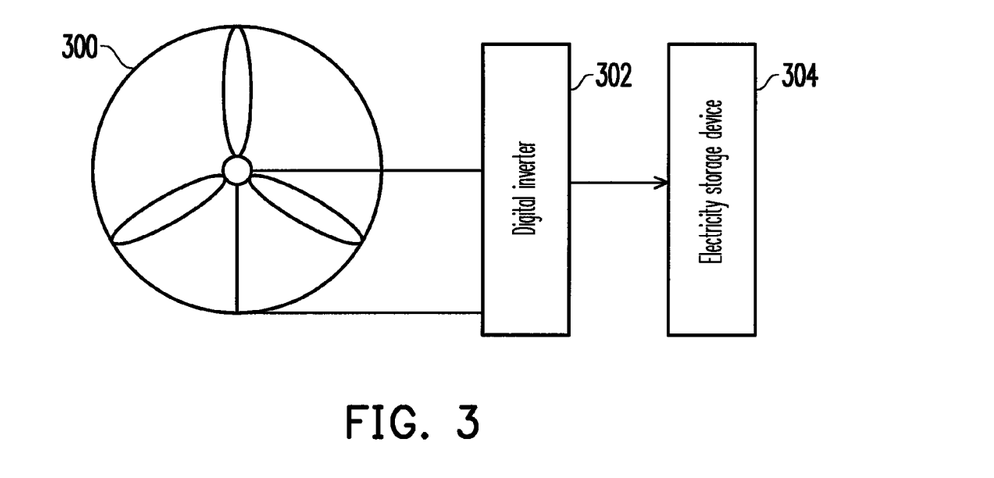
FIG. 3 is a block diagram illustrating a wind electricity generating apparatus applied to the charge apparatus in the first exemplary embodiment.

Referring to FIG. 1 again, the natural energy conversion module 100 may be a solar electricity generating apparatus or a wind electricity generating apparatus. When the natural energy conversion module 100 is a solar electricity generating apparatus, it converts solar energy into the first electric energy. For example, as shown in FIG. 2, the solar electricity generating apparatus includes a photovoltaic cell array 200, a charge battery array 202, a unidirectional current device 204, and an outer lead 206. The photovoltaic cell array 200 includes a plurality of solar chips 210 for receiving solar energy and converting it into the first electric energy. The charge battery array 202 includes a plurality of charge batteries 212 for storing the first electric energy. The unidirectional current device 204 is located between the photovoltaic cell array 200 and the charge battery array 202. The unidirectional current device 204 may be a blocking diode, and this blocking diode can prevent power consumption caused by countercurrent. The outer lead 206 connects the photovoltaic cell array 200, the unidirectional current device 204, and the charge battery array 202. On the other hand, when the natural energy conversion module 100 is a wind electricity generating apparatus, it converts wind energy into the first electric energy. For example, as shown in FIG. 3, the wind electricity generating apparatus includes a wind driven generator 300, a digital inverter 302, and an electricity storage device 304. The wind driven generator 300 converts wind energy into the first electric energy. The digital inverter 302 converts the voltage of the first electric energy. The electricity storage device 304 stores the first electric energy.

Figure 4:
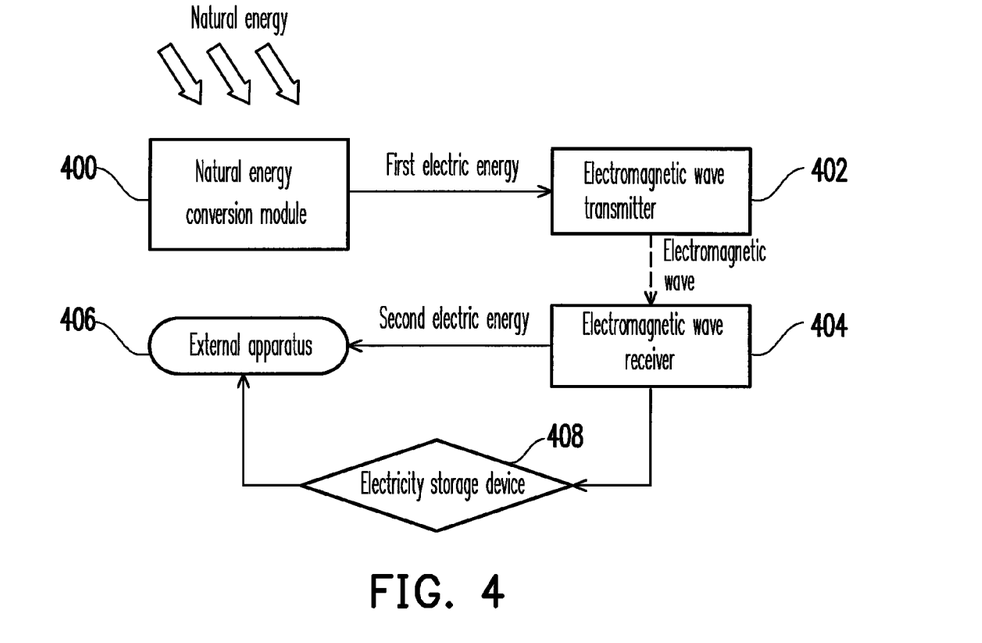
FIG. 4 is a block diagram illustrating a charge apparatus driven by a natural energy according to a second exemplary embodiment of the present disclosure.

FIG. 4 is a block diagram illustrating a charge apparatus driven by a natural energy according to a second exemplary embodiment of the present disclosure.

Referring to FIG. 4, the natural-energy-driven charge apparatus in the present embodiment includes a natural energy conversion module 400, an electromagnetic wave transmitter 402, and an electromagnetic wave receiver 404. The natural energy conversion module 400 receives a natural energy and converts it into a first electric energy. The electromagnetic wave transmitter 402 receives the first electric energy and converts it into an electromagnetic wave (for example, a laser wave or a radio wave). The electromagnetic wave transmitter 402 may be a laser diode (LD) or any other device that can emit a directional light energy. After the electromagnetic wave transmitter 402 generates the laser wave, the light energy is transmitted to the electromagnetic wave receiver 404 through optical fiber or through peer-to-peer transmission with the air as the transmission medium. In addition, a sensor (not shown) may be disposed on the electromagnetic wave transmitter 402 for detecting the position of the electromagnetic wave receiver 404. When it is detected that the electromagnetic wave receiver 404 is getting close, the sensor drives the electromagnetic wave transmitter 402 to emit the electromagnetic wave. The laser wave may be implemented by using a GaAs visible or invisible laser (for example, a laser having its wavelength between 600 nm and 1600 nm), or a GaN visible or deep ultraviolet laser (for example, a laser having its wavelength between 200 nm and 600 nm). Besides, the laser wave may also be an InP laser (for example, a laser having its wavelength between 1100 nm and 1800 nm). The laser wave may further be a solid-state laser, a gas laser, or a LD.

Referring to FIG. 4 again, the electromagnetic wave receiver 404 in the natural-energy-driven charge apparatus receives the aforementioned laser wave and converts it into a second electric energy to be consumed by an external apparatus 406. For example, the electromagnetic wave receiver 404 in the present embodiment includes a photo detector. The photo detector may be a photovoltaic semiconductor, a photodiode, a phototransistor, or a photovoltaic cell. The photo detector is applicable to the detection of both visible and invisible lights. The electric energy converted by the photo detector is usually a current source. The current source can be converted into a voltage source. Alternatively, the second electric energy is first stored in an electricity storage device (for example, a battery) 408 and then used for driving the backend external apparatus 406, e.g. a light emitting device, a mobile device, or a display device, etc. For example, a GaAs laser with wavelength 980 nm emits a 100 mW laser beam and transmits the laser beam to the photo detector through optical fiber to generate a current of 40 mA. Herein this current of 40 mA is enough for driving a small bulb. In the second embodiment, the transmission medium between the electromagnetic wave transmitter 402 and the electromagnetic wave receiver 404 may be air or optical fiber. The natural energy conversion module 400 can be referred to the natural energy conversion module 100 in the first embodiment.

Figure 5:
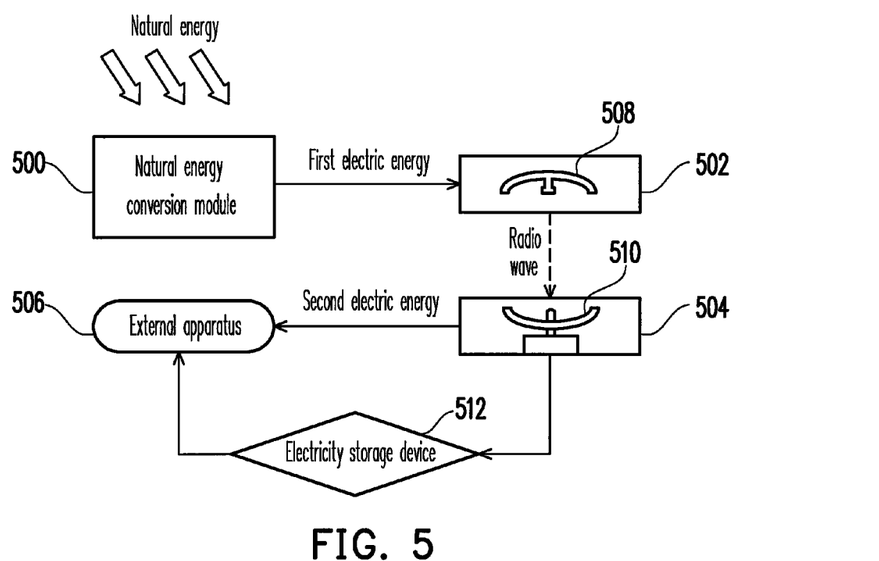
FIG. 5 is a block diagram illustrating a charge apparatus driven by a natural energy according to a third exemplary embodiment of the present disclosure.

FIG. 5 is a block diagram illustrating a charge apparatus driven by a natural energy according to a third exemplary embodiment of the present disclosure.

Referring to FIG. 5, the natural-energy-driven charge apparatus in the present embodiment includes a natural energy conversion module 500, a radio wave transmitter 502, and a radio wave receiver 504. The natural energy conversion module 500 receives a natural energy and converts it into a first electric energy. The natural energy conversion module 500 can be referred to the natural energy conversion module 100 in the first embodiment. The radio wave transmitter 502 is connected to the natural energy conversion module 500, receives the first electric energy and converts the first electric energy into a radio wave. In addition, a sensor (not shown) may be disposed on the radio wave transmitter 502 for detecting the position of the radio wave receiver 504. When it is detected that the radio wave receiver 504 is getting close, the sensor drives the radio wave transmitter 502 to emit the radio wave. The radio wave receiver 504 is disposed opposite to the radio wave transmitter 502, receives the radio wave and converts the radio wave into a second electric energy to be consumed by an external apparatus 506. The radio wave transmitter 502 includes a transmitting antenna 508, and the transmitting antenna 508 converts the first electric energy into an electromagnetic wave and radiates it into the space. The radio wave receiver 504 also includes a receiving antenna 510 for receiving the radio wave and converting it into the second electric energy. The natural-energy-driven charge apparatus may further include an electricity storage device 512. The electricity storage device 512 is connected to the radio wave receiver 504 and stores the second electric energy to be consumed by the external apparatus 506. In the present embodiment, the radio wave transmitter 502 and the radio wave receiver 504 may be induction coils, and the transmission medium between the radio wave transmitter 502 and the radio wave receiver 504 may be waveguide or air.

Figure 6:
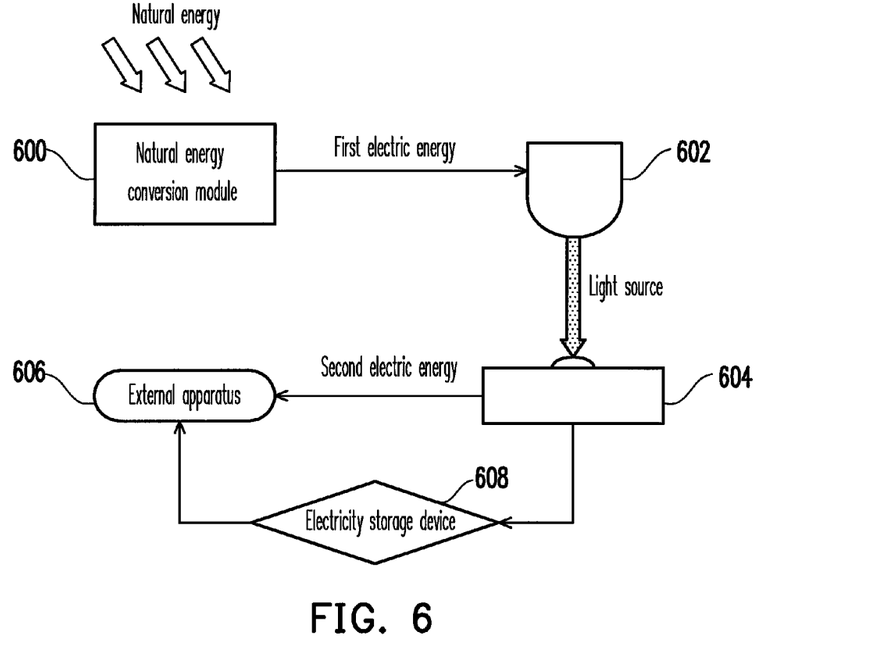
FIG. 6 is a block diagram illustrating a charge apparatus driven by a natural energy according to a fourth exemplary embodiment of the present disclosure.

FIG. 6 is a block diagram illustrating a charge apparatus driven by a natural energy according to a fourth exemplary embodiment of the present disclosure.

Referring to FIG. 6, the natural-energy-driven charge apparatus in the present embodiment includes a natural energy conversion module 600, a light emitting device 602, and a photo detector 604. The natural energy conversion module 600 receives a natural energy and converts it into a first electric energy. The natural energy conversion module 600 can be referred to the natural energy conversion module 100 in the first embodiment. The light emitting device 602 is connected to the natural energy conversion module 600, and which receives the first electric energy and converts it into a light source, wherein the light source may be an electromagnetic light (for example, a: laser wave) or a non-electromagnetic light (for example, the light emitted by a LED or a fluorescent bulb). In the present embodiment, the light emitting device 602 may be a LED or a fluorescent bulb. In addition, a sensor (not shown) may be disposed on the light emitting device 602 for detecting the position of the photo detector 604. When it is detected that the photo detector 604 is getting close, the sensor drives the light emitting device 602 to emit light. Because the photo detector 604 in the present embodiment can detect light of related wavelength, a high photoelectric conversion rate over 60% is achieved. Thus, the energy conversion rate is increased considerably compared to that in a photovoltaic cell. Besides, the wavelengths of light absorbed by a photovoltaic cell range from 0.4 μm to 1.1 μm. In the present disclosure, the selection of wavelength range is made more flexible by adopting a photo detector corresponding to a light source.

Referring to FIG. 6 again, the photo detector 604 is disposed opposite to the light emitting device 602, receives the aforementioned light source and converts the light source into a second electric energy to be consumed by an external apparatus 606. The photo detector 604 may be a photovoltaic semiconductor, a photodiode, a phototransistor, or a photovoltaic cell, wherein the phototransistor is usually composed of a photodiode and a transimpedance amplifier. The transimpedance amplifier converts the current supplied by the photodiode into a voltage so that a voltage source is output. Besides, in the present embodiment, the natural-energy-driven charge apparatus further includes a first electricity storage device 608. The first electricity storage device 608 is connected to the photo detector 604 for storing the second electric energy.

Figure 7:
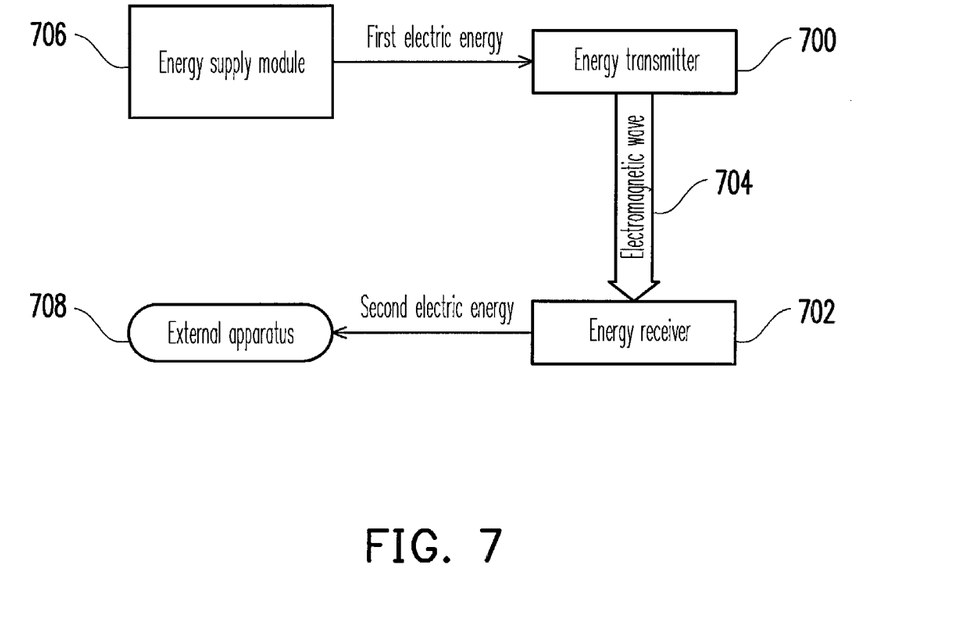
FIG. 7 is a block diagram illustrating an electromagnetic wave charge apparatus according to a fifth exemplary embodiment of the present disclosure.

FIG. 7 is a block diagram illustrating an electromagnetic wave charge apparatus according to a fifth exemplary embodiment of the present disclosure.

Referring to FIG. 7, the electromagnetic wave charge apparatus in the present embodiment includes an energy transmitter 700 and an energy receiver 702. The energy transmitter 700 receives a first electric energy and converts it into an electromagnetic wave (for example, a radio wave or a laser wave). The energy receiver 702 receives the electromagnetic wave from the energy transmitter 700 through a transmission medium 704 and converts the electromagnetic wave into a second electric energy. In addition, a sensor (not shown) may be disposed on the energy transmitter 700 for detecting the position of the energy receiver 702. When it is detected that the energy receiver 702 is getting close, the sensor drives the energy transmitter 700 to start working The transmission medium 704 may be air, optical fiber, or waveguide, wherein the optical fiber may be quartz optical fiber or plastic optical fiber. Moreover, the electromagnetic wave charge apparatus in the present embodiment further includes an energy supply module 706 for supplying the first electric energy to the energy transmitter 700. The energy supply module 706 may be a general power supply or a natural energy conversion module. For example, the general power supply may be a battery or mains electricity, and the natural energy may be solar energy or wind energy. Finally, the second electric energy converted by the energy receiver 702 is supplied to and consumed by an external apparatus 708.

Figure 8A:
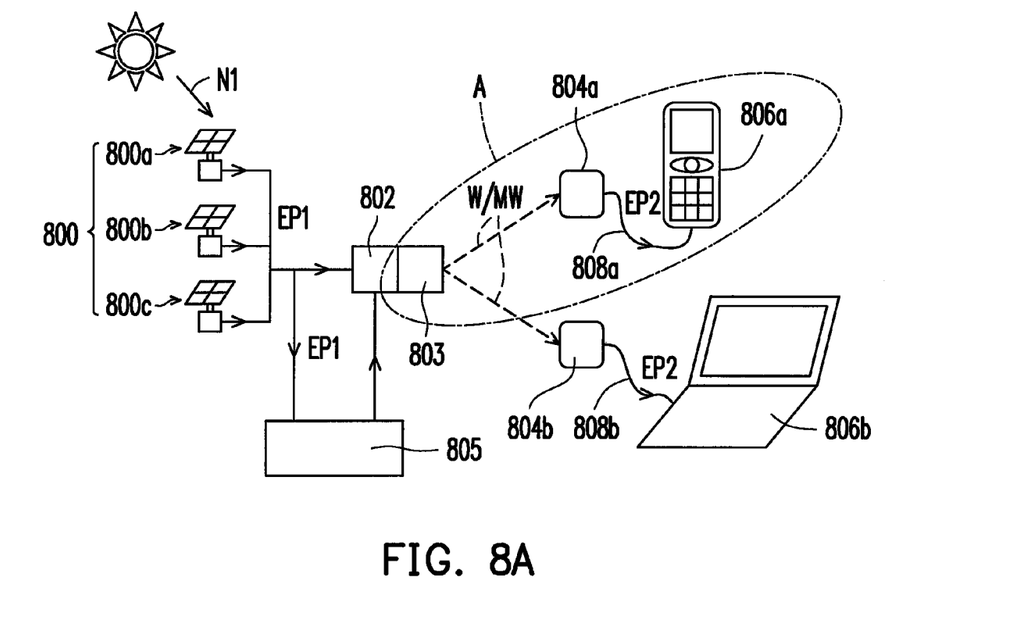
FIG. 8A is a diagram illustrating a charge apparatus driven by a natural energy according to a sixth exemplary embodiment of the present disclosure.

FIG. 8A is a diagram illustrating a charge apparatus driven by a natural energy according to a sixth exemplary embodiment of the present disclosure.

Referring to FIG. 8A, the natural-energy-driven charge apparatus in the present embodiment includes a natural energy conversion module 800, an energy converter 802, an energy transmitter 803, and a plurality of energy receivers 804a and 804b (only two of which are illustrated in FIG. 8 as examples).

The natural energy conversion module 800 receives a natural energy N1 (for example, a solar energy) and converts it into a first electric energy EP1. In the present embodiment, the natural energy conversion module 800 includes conversion units 800a, 800b, and 800c. The conversion units 800a, 800b, and 800c may be photovoltaic cells, and these photovoltaic cells are electrically connected with each other and converts the solar energy into the first electric energy EP1. In another embodiment, the natural energy N1 includes at least one of solar energy, water energy, geothermal energy, wave energy, tidal energy, wind energy, and biomass energy.

Referring to FIG. 8A again, the energy converter 802 converts the first electric energy EP1 into a wireless energy W. The wireless energy W may be a magnetic energy or an electromagnetic wave, wherein the electromagnetic wave may be a microwave, a light wave, a radio wave, or a laser wave. In another embodiment, the wireless energy W may be a magnetic energy and an electromagnetic wave.

The energy transmitter 803 is electrically connected to the energy converter 802. The energy transmitter 803 receives the wireless energy W and transmits it in a wireless manner. To be specific, when the energy converter 802 converts the first electric energy EP1 into the wireless energy W which can be conveniently transmitted in a wireless manner, an energy splitter (not shown) in the energy transmitter 803 splits the wireless energy W into a plurality of energy portions and transmits these energy portions to the energy receivers 804a and 804b of a plurality of external apparatuses in a wireless manner. The energy splitter may be disposed on the energy transmitter 803 to simplify the apparatus.

Then, the energy receivers 804a and 804b receive the wireless energy W in a wireless manner and convert the received wireless energy W into a second electric energy EP2 to be consumed by external apparatuses 806a and 806b. Herein the external apparatuses 806a and 806b may be cell phones or notebook computers. In addition, the wireless energy W in the present embodiment may be laser. Since laser is highly collimated, easy to integrate, and free of radio frequency (RF) interference, the highly intensive wireless energy W to the energy receivers 804a and 804b can be exactly transmitted.

As shown in FIG. 8A, the energy receivers 804a and 804b may be connected to the external apparatuses 806a and 806b by, for example, the circuits 808a and 808b, and the circuits 808a and 808b transmit the converted second electric energy EP2 to the external apparatuses 806a and 806b to charge the external apparatuses 806a and 806b.

Additionally, the energy transmitter 803 in the present embodiment may also transmit a microwave signal MW to locate the energy receiver 804a or 804b. In other words, in the present embodiment, the position of the external apparatus 806a or 806b is determined by using microwave. Compared to the conventional positioning technique in which a regular light beam is used, positioning within a large area can be carried out by using microwave due to the high directivity of microwave. Besides, because the transmission of microwave is not affected by the weather (unlike a regular light beam), after the energy transmitter 803 determines the position of the energy receiver 804a or 804b, it can transmit energy to the external apparatus 806a or 806b in the specific direction so that the energy transmission efficiency can be improved.

Referring to FIG. 8A again, the natural-energy-driven charge apparatus in the present embodiment further includes an electricity storage device 805. The electricity storage device 805 is electrically connected to the natural energy conversion module 800, and the first electric energy EP1 is stored in the electricity storage device 805 through circuit transmission. After that, the energy converter 802 converts the first electric energy EP1 into the wireless energy W, and the energy transmitter 803 transmits the wireless energy W to the energy receivers 804a and 804b in a wireless manner.

To be specific, in the present embodiment, a converter (not shown) may be disposed on the energy receivers 804a and 804b to convert the wireless energy W into the second electric energy EP2, so that the second electric energy EP2 can be consumed by the external apparatuses 806a and 806b. In another embodiment, the energy transmitted between the energy receivers 804a and 804b and the external apparatuses 806a and 806b may be through waveguide instead of the circuits 808a and 808b.

Figure 8B:
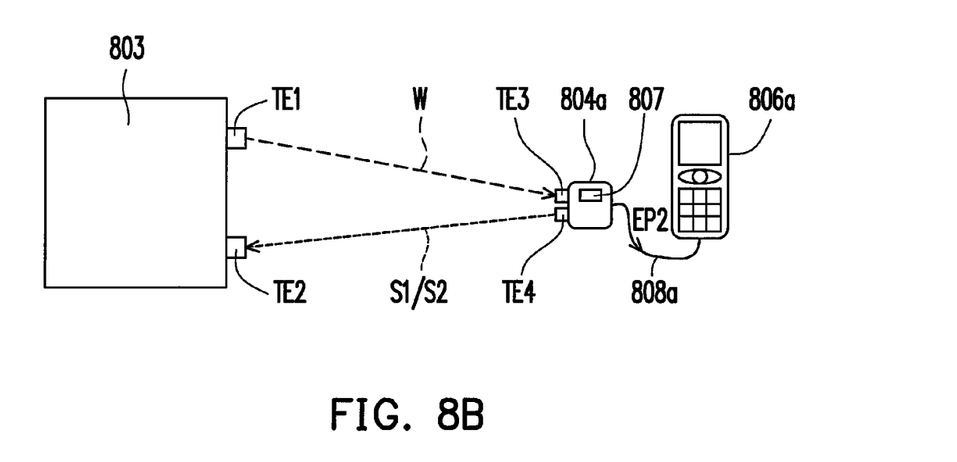
FIG. 8B is an enlarged view of area A in FIG. 8A.

FIG. 8B is an enlarged view of area A in FIG. 8A. As shown in FIG. 8B, the energy transmitter 803 includes a transmitting end TE1 and a receiving end TE2. The transmitting end TE1 transmits the wireless energy W to the energy receiver 804a in a wireless manner. The receiving end TE2 receives an instruction signal S1 from the energy receiver 804a, wherein the instruction signal S1 provides an energy transmission information to the energy transmitter 803. In the present embodiment, the energy transmission information may be a current charge status of the external apparatus 806a.

On the other hand, the energy receiver 804a in the present embodiment may further include a receiving end TE3 and a transmitting end TE4. The receiving end TE3 receives the wireless energy W from the energy receiver 803, and the transmitting end TE4 transmits the instruction signal S1 to the energy receiver 803. To be specific, when the receiving end TE3 of the energy receiver 804a receives the wireless energy W from the transmitting end TE1 of the energy transmitter 803, the transmitting end TE4 of the energy receiver 804a transmits the instruction signal S1 to the receiving end TE2 of the energy receiver 803, wherein the instruction signal S1 represents the energy transmission information (i.e., the current charge status of the external apparatus 806a).

Figure 9:
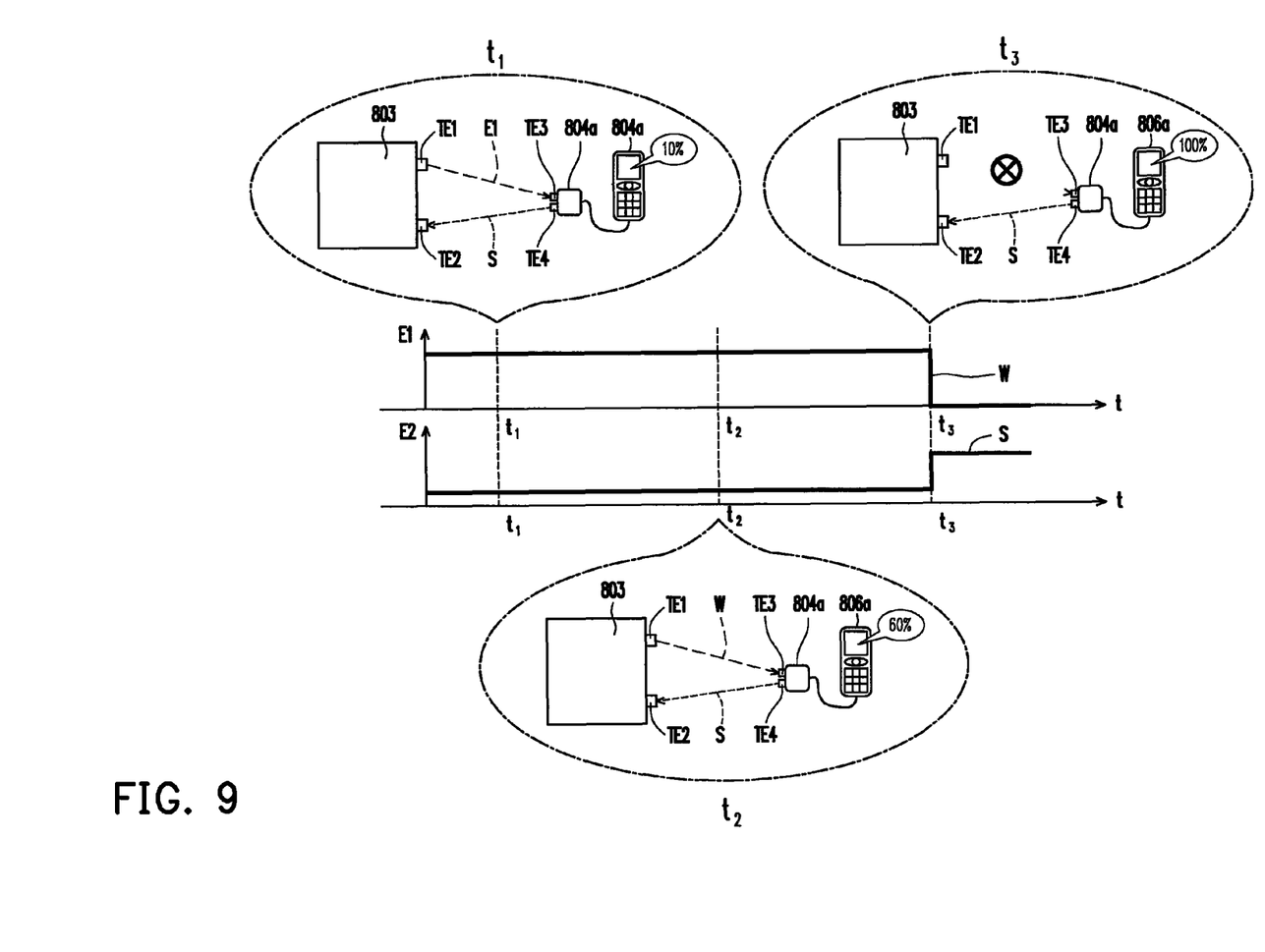
FIG. 9 is a diagram illustrating how an energy transmitter monitors the charge status of an external apparatus.

FIG. 9 is a diagram illustrating how the energy transmitter 803 monitors the charge status of the external apparatus 806a.

Referring to FIG. 9, when the external apparatus 806a is not fully charged yet (for example, $t=t_1$ and $t=t_2$), the energy transmitter 803 continues to supply the wireless energy W. Contrarily, after the external apparatus 806a is fully charged (for example, $t=t_3$), the intensity E2 corresponding to the instruction signal S changes and is transmitted back to the energy transmitter 803 so that the energy transmitter 803 stops supplying the wireless energy W. As described above, the energy transmitter 803 can monitor the charge status of the external apparatus 806a according to the instruction signal S1, so as to determine whether to continues supplying the wireless energy W. Thereby, the power consumption can be reduced.

Additionally, as shown in FIG. 8B, in the present embodiment, the energy receiver 804a may further include a controller 807. The controller 807 executes a logic operation. The energy receiver 804a transmits a displacement signal S2 to the energy transmitter 803 according to the operation result of the controller 807 such that the energy transmitter 803 can adjust the position of the transmitting end TE1.

To be specific, when the energy receiver 804a starts to transmit the wireless energy W, the controller 807 performs the position adjustment to find the maximum value of the wireless energy W within the area in which the energy receiver 804a is located. Meanwhile, the energy receiver 804a keeps receiving the wireless energy W. When the intensity E1 of the received wireless energy W is lower than a predetermined threshold, the transmitting end TE4 of the energy receiver 804a outputs the displacement signal S2 to notify the energy transmitter 803 to adjust the position of the transmitting end TE1, so that an optimal working point can be maintained between the transmitting end TE1 of the energy transmitter 803 and the receiving end TE3 of the energy receiver 804a.

It should be noted that in the present embodiment, even though the wireless energy W is transmitted in a single direction, other signals may be transmitted in a single direction or in two different directions. As described above, the energy transmitter 803 transmits the microwave signal MW to locate the energy receiver 804a or 804b. After that, the energy receiver 804a transmits the displacement signal S2, and the energy transmitter 803 determines whether to adjust the position or direction of the transmitting end TE1 according to the displacement signal S2. Namely, the signal transmission between the transmitting end TE4 and the receiving end TE2 is not limited to the single direction from the transmitting end TE4 to the receiving end TE2. Instead, it could be bidirectional.

Figure 10:
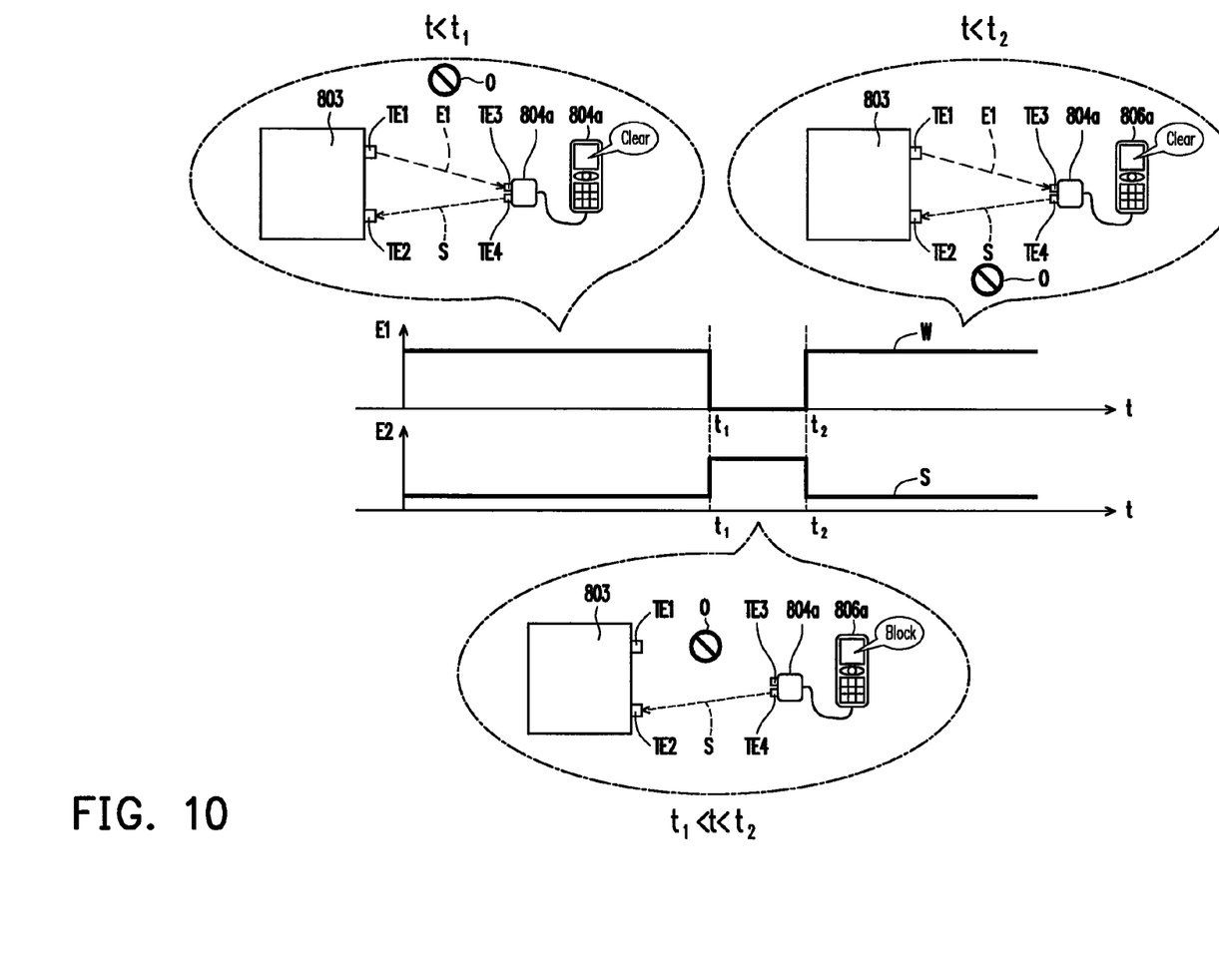
FIG. 10 is a diagram illustrating how an energy transmitter determines whether there is any obstacle in a transmission path.

Moreover, as shown in FIG. 10, besides monitoring the charge status, the transmitting end TE4 and the receiving end TE2 may also simultaneously provide an information indicating whether an obstacle O blocking the energy transmission exists in the transmission path. Namely, the energy transmission information may be a transmission path information. Referring to FIG. 10, when the obstacle O does not exist in the transmission path between the receiving end TE3 and the transmitting end TE1 (for example, t<t1), the instruction signal S instructs the energy transmitter 803 to supply the wireless energy W continuously. Contrarily, when the obstacle O exists in the transmission path (for example, t1<t<t2), the energy E2 of the instruction signal S changes to notify the energy transmitter 803 to stop supplying the wireless energy W. After the obstacle O leaves the transmission path (for example, t>t2), the intensity E2 of the instruction signal S changes again to notify the energy transmitter 803 to supply the wireless energy W again.

As described above, through the obstacle monitoring function, energy loss caused by invalid transmission is prevented, and meanwhile, any damage caused by the transmitted wireless energy to a living creature that passes through the transmission path is also prevented. In other words, the charge apparatus in the present embodiment offers a life protection function. In addition, the functions of the transmitting end TE4 and the receiving end TE2 are not limited to those described in the present embodiment, and other possible states (for example, any malfunction or the charge status of the energy transmitter 803) of the energy transmitter 803 and the energy receiver 804a may be shared between the transmitting end TE4 and the receiving end TE2.

Referring to FIG. 8B, in another embodiment, the transmitting end TE1 of the energy transmitter 803 may also be a fiber optic connector. In other words, the energy transmitter 803 may be considered a charging station with a fiber optic connector. Thus, the energy transmitter 803 is connected to the energy receiver 804a through optical fiber to transmit light energy. After that, the energy receiver 804a converts the light energy into the second electric energy EP2 to be consumed by the external apparatus 806a.

Figure 11:
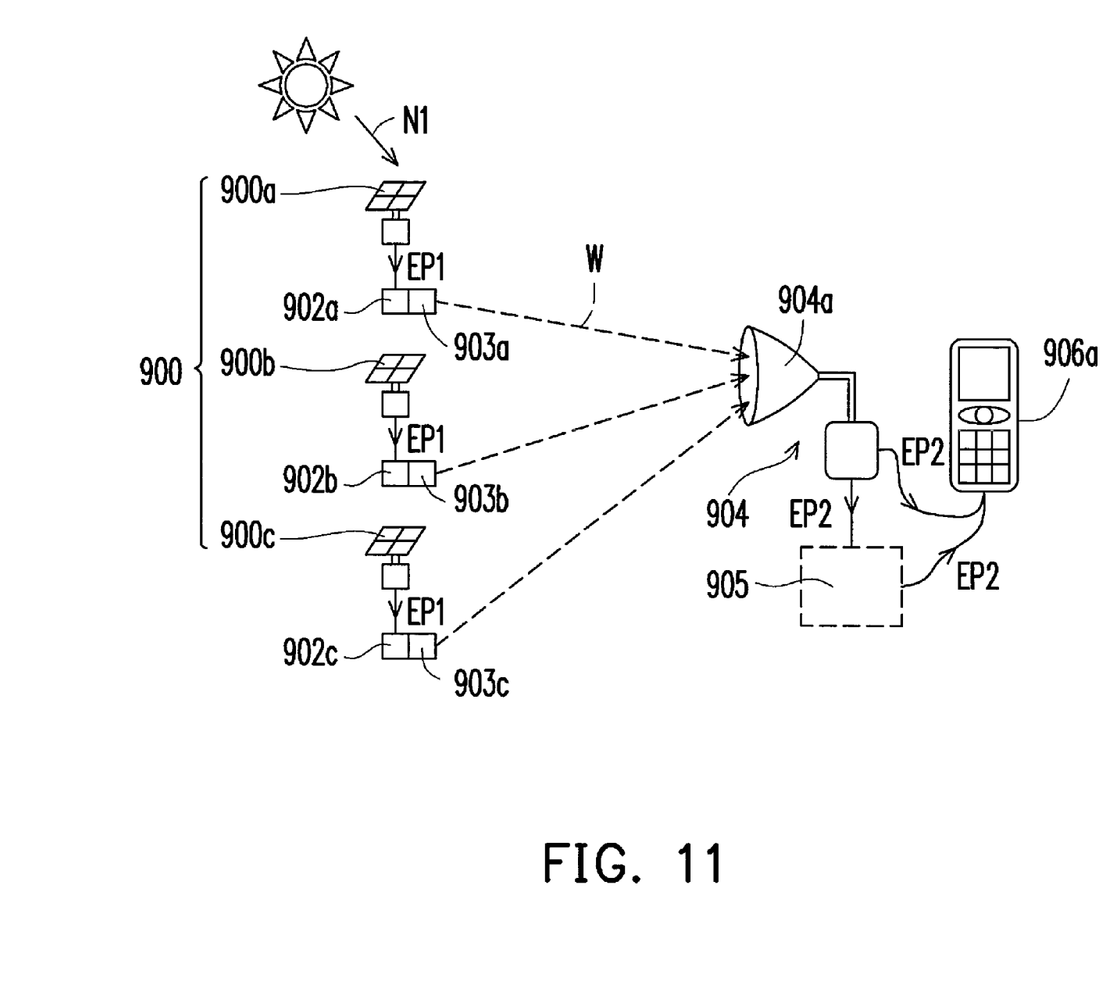
FIG. 11 is a diagram illustrating a charge apparatus driven by a natural energy according to a seventh exemplary embodiment of the present disclosure.

FIG. 11 is a diagram illustrating a charge apparatus driven by a natural energy according to a seventh exemplary embodiment of the present disclosure.

Referring to FIG. 11, the natural-energy-driven charge apparatus in the present embodiment includes a natural energy conversion module 900, a plurality of energy converters 902, a plurality of energy transmitters 903, and an energy receiver 904a. The natural energy conversion module 900 includes a plurality of conversion units 900a, 900b, and 900c.

In the present embodiment, the conversion units 900a, 900b, and 900c convert a natural energy N1 into a first electric energy EP1, and the conversion units 900a, 900b, and 900c may be photovoltaic cells. The charge apparatus in the present embodiment is similar to the charge apparatus in the sixth embodiment, while the main difference between the two is that each of the conversion units 900a, 900b, and 900c has a corresponding energy converter 902a, 902b, or 902c and a corresponding energy transmitter 903a, 903b, or 903c. The energy converters 902a, 902b, and 902c convert the first electric energy EP1 into a wireless energy W. The energy transmitters 903a, 903b, and 903c receive the wireless energy W and transmit it to the energy receiver 904 in a wireless manner.

To be specific, when the energy converters 902a, 902b, and 902c convert the first electric energy EP1 into the wireless energy W (for example, an electromagnetic wave energy), the energy transmitters 903a, 903b, and 903c transmit the wireless energy W to the energy receiver 904 in a wireless manner In the present embodiment, to increase the wireless transmission efficiency, the energy receiver 904 includes an energy receiving head 904a. In the present embodiment, a receiving surface of the energy receiving head 904a is in a cone shape. However, in other embodiments, the receiving surface of the energy receiving head 904a may also be in a parabolic shape, an elliptical shape, a hemispherical shape, a funneled shape, a bowl shape, a disc shape, or any other shape that can increase the receiving efficiency. For example, in another embodiment, the energy receiver 904 may be an antenna, such as a dipole antenna, a panel antenna, a microstrip antenna, a multiple element dipole antenna, a Yagi antenna, a parabolic dish, an omniantenna, a grid antenna, or a disc antenna.

As shown in FIG. 11, because the energy receiver 904 in the present embodiment has the energy receiving head 904a, the wireless energy W transmitted by the energy transmitters 903a, 903b, and 903c from different directions can be simultaneously received. In addition, an electricity storage device 905 may be connected to the energy receiver 904 externally. After the energy receiver 904 converts the wireless energy W into the second electric energy EP2, the second electric energy EP2 may be stored into the electricity storage device 905 and then a determination for determining whether to transmit the second electric energy EP2 to an external apparatus 906a to charge the same according to the actual requirement is performed.

In another embodiment, the energy receiver 904 may be implemented as a rotary energy receiver such that the receiving angle can be adjusted according to the positions of the energy transmitters 903a, 903b, and 903c. For example, the energy receiving head 904a can rotate to sequentially receive the wireless energy W emitted by the energy transmitters 903a, 903b, and 903c from different directions. In other embodiments, the energy transmitters 903a, 903b, and 903c may be disposed in different power plants, and the energy receiver 904 may be disposed on the top of a building along with the electricity storage device 905, so that the energy receiver 904 can receive the wireless energy W from the power plants, convert the wireless energy W into the second electric energy EP2, and store the second electric energy EP2 into the electricity storage device 905 or supply the second electric energy EP2 to the residents in the building.

Additionally, in the present embodiment, the conversion units 900a, 900b, and 900c are all solar panels. However, in another embodiment, the conversion units 900a, 900b, and 900c may also be wind power plants, geothermal power plants, or hydraulic power plants.

Figure 12:
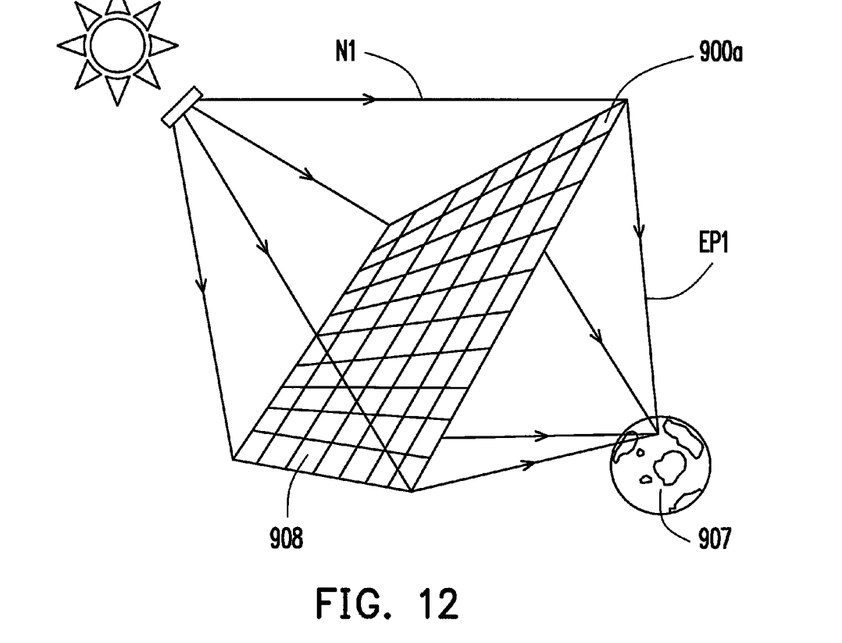
FIG. 12 is a diagram illustrating a charge apparatus driven by a natural energy according to another exemplary embodiment of the present disclosure.

Moreover, as shown in FIG. 12, in another embodiment, the conversion unit 900a may also be disposed in the space to directly collect solar energy (i.e., the natural energy N1). For example, a solar panel 908 that has a surface area of up to several square kilometers can be deployed on a synchronous orbit outside the aerosphere of the Earth 907 for collecting the more intensive solar energy N1 compared to that collected on the ground. Then, the solar energy N1 is transmitted back to the energy receiver 904 (illustrated in FIG. 11) on the Earth 907 through laser or microwave, and the energy receiver 904a may be a giant disc antenna located within a prohibited area on the sea or a reservoir.

Figure 13:
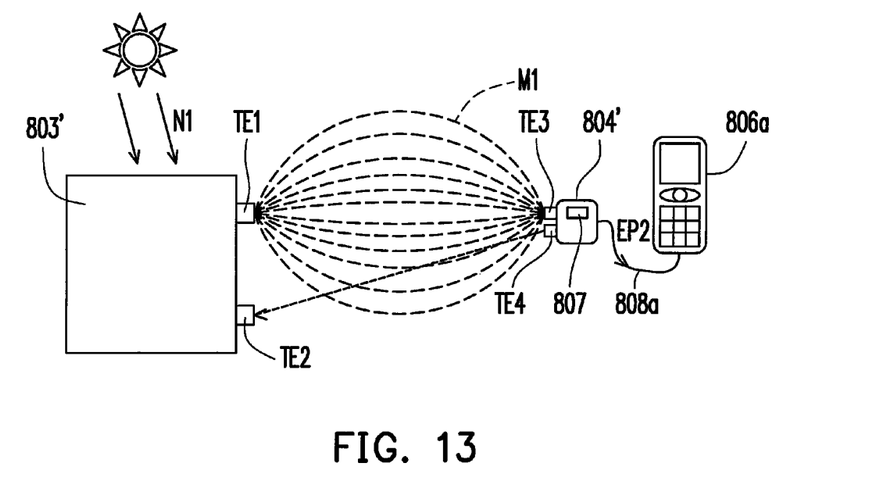
FIG. 13 is a diagram illustrating how an energy transmitter transmits a wireless energy to an energy receiver according to another exemplary embodiment of the present disclosure.

FIG. 13 is a diagram illustrating how an energy transmitter transmits a wireless energy to an energy receiver according to another exemplary embodiment of the present disclosure.

As shown in FIG. 13, in the present embodiment, the energy transmitter 803' transmits the wireless energy W through a magnetic field M1. To be specific, the energy transmitter 803' converts the first electric energy EP1 received from the energy converter 802 (illustrated in FIG. 8A) into a magnetic energy M1 and radiates it into the space. The external apparatus 806a receives the magnetic energy M1 through an energy receiver 804' and converts the magnetic energy M1 into the second electric energy EP2 to be consumed by the external apparatus 806a. In addition, the energy receiver 804' may also be a multipolar receiver having multiple magnetic poles. Namely, the energy receiver 804' is a receiver with multiple N/S polarity combinations such that the magnetic energy M1 in the space can be effectively collected and converted into the second electric energy EP2 to be consumed by the external apparatus 806a.

Figure 14:
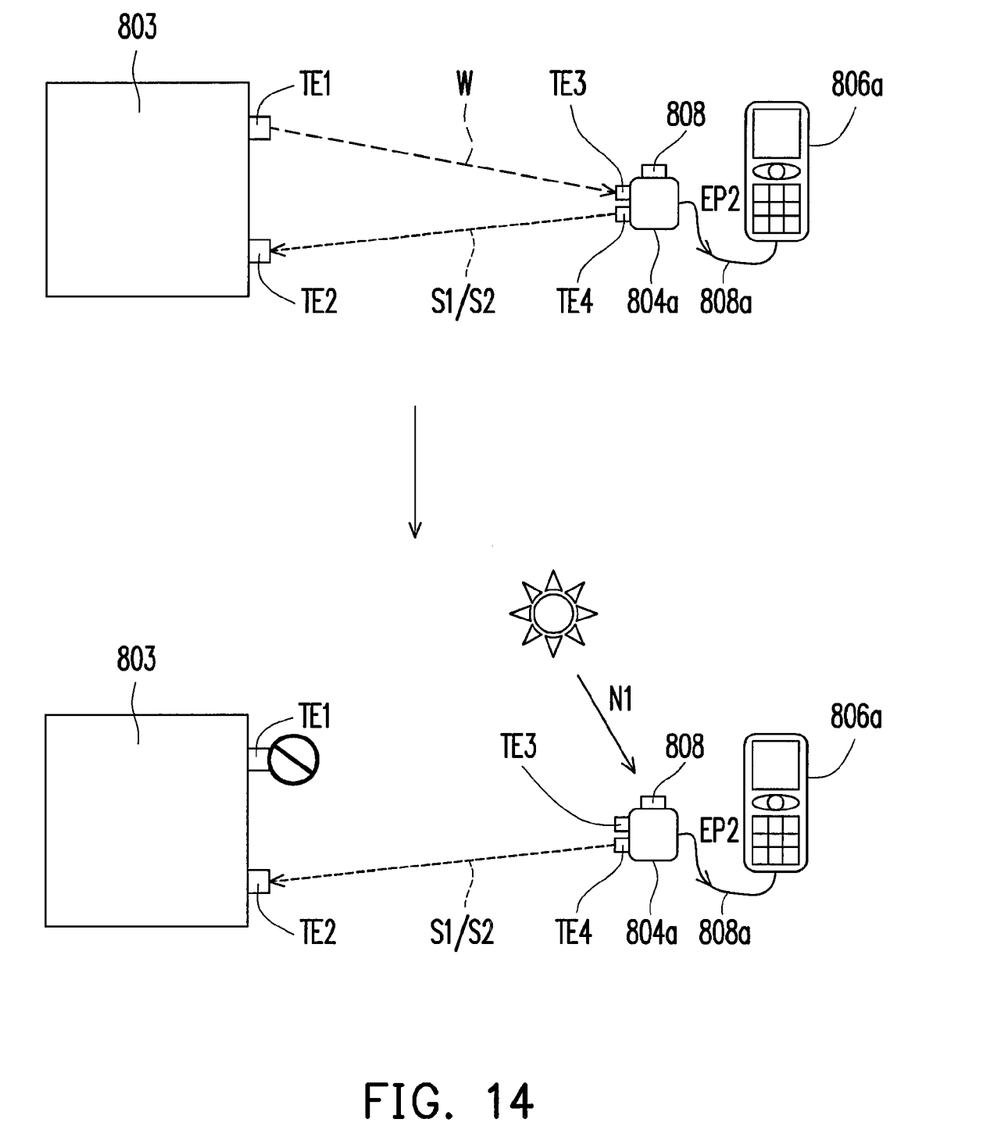
FIG. 14 is a diagram illustrating how an energy transmitter transmits a wireless energy to an energy receiver according to another exemplary embodiment of the present disclosure.

FIG. 14 is a diagram illustrating how an energy transmitter transmits a wireless energy to an energy receiver according to another exemplary embodiment of the present disclosure.

As shown in FIG. 14, besides that the external apparatus 806a receives the wireless energy W from the energy transmitter 803 and the energy receiver 804a converts the wireless energy W into the second electric energy EP2, as illustrated at the lower part of the FIG. 14, when the energy transmitter 803 stops transmitting energy, if the energy receiver 804a is located within the transmission environment of other wireless energy (for example, light energy, radio wave, or solar energy), the energy receiver 804a directly converts the natural energy N1 (for example, the solar energy) into the second electric energy EP2 to be consumed by the external apparatus 806a by using an auxiliary natural energy conversion module 808. The auxiliary natural energy conversion module 808 may be a solar panel disposed on the energy receiver 804a.

Moreover, the energy receiver 804a may have a general receptacle, and when the supply of the natural energy N1 stops, energy can still be supplied to the external apparatus 806a through the receptacle or a battery. As described above, the energy receiver 804a in the present embodiment is a multifunctional apparatus.

Figure 15:
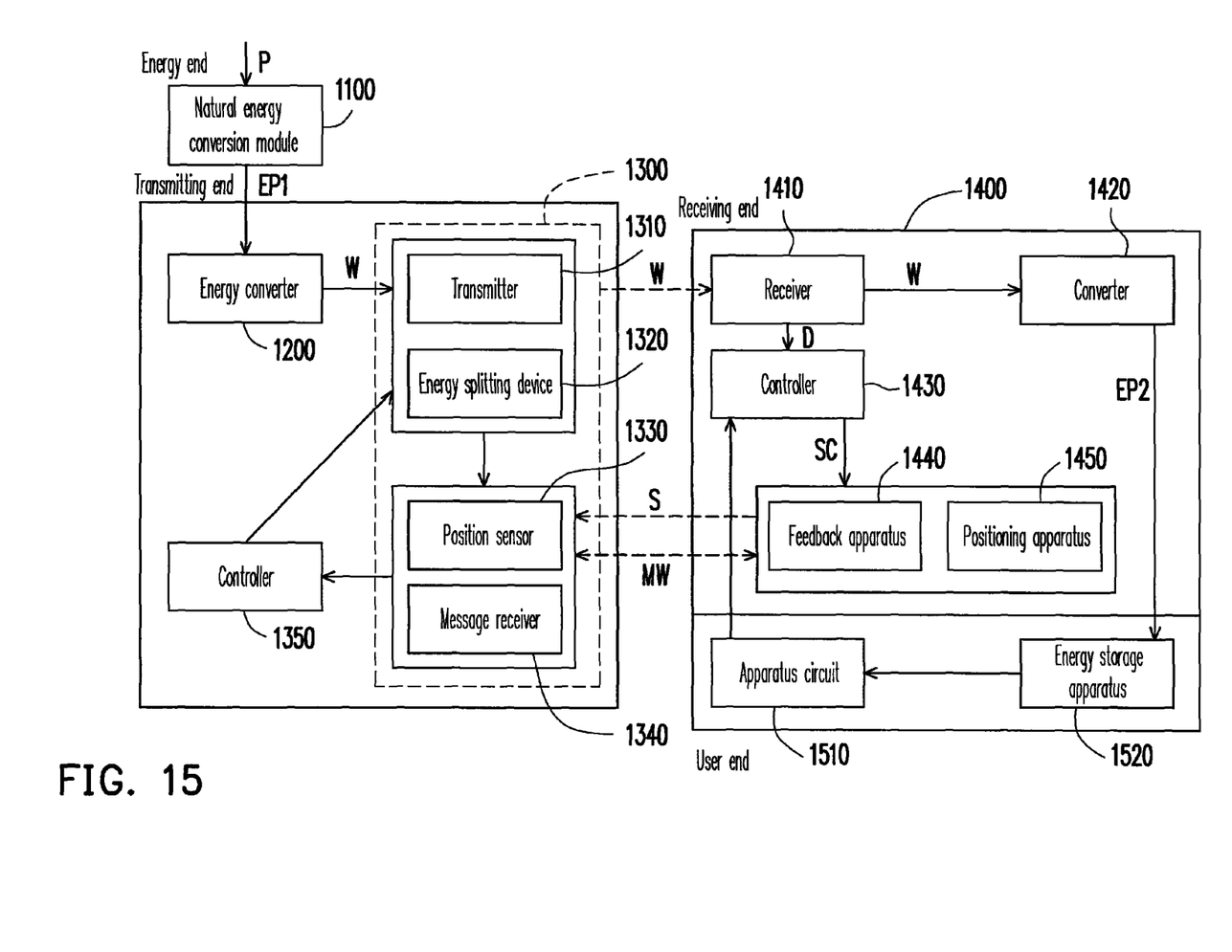
FIG. 15 is a block diagram illustrating a charge apparatus driven by a natural energy according to another exemplary embodiment of the present disclosure.

FIG. 15 is a block diagram illustrating a charge apparatus driven by a natural energy according to another exemplary embodiment of the present disclosure. The natural-energy-driven charge apparatus in the present embodiment includes an energy end, a transmitting end, a receiving end, and a user end. The energy end may be an energy conversion module 1100, and the energy conversion module 1100 receives an energy P, converts the energy P into a first electric energy EP1, and transmits the first electric energy EP1 to the transmitting end, wherein the energy P may be a natural energy, the mains electricity, or other energies. The transmitting end includes an energy converter 1200 and an energy transmitter 1300. The energy converter 1200 converts the first electric energy EP1 into a wireless energy W and transmits the wireless energy W to the energy transmitter 1300.

In the present embodiment, the energy transmitter 1300 includes a transmitter 1310, an energy splitting device 1320, a position sensor 1330, and a message receiver 1340. The transmitter 1310 transmits the wireless energy W to the receiving end in a wireless manner The wireless transmission may be achieved through electromagnetic induction, microwave, or light energy, wherein electromagnetic induction has shorter transmission distance but is easier to implement and safer to human health.

In addition, the energy splitter 1320 allows the energy transmitter 1300 to transmit different portions of the wireless energy W to a plurality of receiving ends. As shown in FIG. 15, the receiving end may be an energy receiver 1400, and the energy receiver 1400 includes a receiver 1410 and a converter 1420. The receiver 1410 receives the wireless energy W and transmits it to the converter 1420 in a wireless manner. The converter 1420 converts the wireless energy W into a second electric energy EP2 to be consumed by an external apparatus. Herein the external apparatus may be an apparatus circuit 1510 or an energy storage apparatus 1520 at the user end, wherein the energy storage apparatus 1520 may be an electricity storage device deployed on the top of a building to be used by residents in the building.

The energy receiver 1400 further includes a controller 1430, a feedback apparatus 1440, and a positioning apparatus 1450. The positioning apparatus 1450 sends a displacement signal S to the energy transmitter 1300 to allow the energy transmitter 1300 to adjust the transmission direction of the wireless energy W. The controller 1430 controls the feedback apparatus 1440 and the positioning apparatus 1450 according to an information D of the receiver 1410, wherein the information D may be the status of the wireless energy W currently received by the receiver 1410. When the controller 1430 detects that the intensity of the wireless energy W received by the receiver 1410 is lower than a predetermined threshold, the feedback apparatus 1440 and the positioning apparatus 1450 that receive a control signal CS2 send an instruction signal S to the position sensor 1330 and the message receiver 1340 at the transmitting end. Then the controller 1350 at the transmitting end adjusts the energy distribution quantity of the energy splitter 1320 or the transmission position or direction of the energy transmitter 1300, so as to allow the receiver 1410 at the receiving end to receive a more intensive wireless energy W. On the other hand, a position sensing apparatus 1330 and the positioning apparatus 1450 may communicate with each other through microwave in a single direction or in two different directions between the transmitting end and the receiving end to determine the exact position of the receiving end. Moreover, similar to that in the embodiment described above, the natural-energy-driven charge apparatus in the present embodiment also offers the charge status detecting and obstacle monitoring functions such that the power consumption can be reduced and human safety can be protected. The present embodiment can be referred to related description of foregoing embodiments therefore will not be described herein.

In summary, a natural-energy-driven charge apparatus provided by the present disclosure can convert a natural energy into electric energy, and therefore is very economical and environment-friendly. Besides, the natural-energy-driven charge apparatus provided by the present disclosure can control the charge status of a charged apparatus. In addition, in a natural-energy-driven charge apparatus provided by the present disclosure, the electric energy is converted into an electromagnetic wave by an electrically-driven energy transmitter, and the electromagnetic wave is received and stored as electric energy by an energy receiver, so that the effect of conventional energy charging through power cable is achieved. Thus, the problems of oxidized contact point, power failure, and electromagnetic interference in the existing contact charging technique are prevented, and the problem of tangled cables when different electronic products are used can be avoided. Moreover, in the natural-energy-driven charge apparatus provided by the present disclosure, no additional circuit is required for connecting the energy transmitter and the energy receiver so that the application of the natural-energy-driven charge apparatus is not limited by its working environment.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A charge apparatus driven by a natural energy, comprising:
   a natural energy conversion module, receiving a natural energy and converting the natural energy into a first electric energy, wherein the natural energy is at least one of solar energy, water energy, geothermal energy, wave energy, tidal energy, and wind energy;
   an energy converter, electrically connected to the natural energy conversion module and converting the first electric energy into light energy;
   an energy transmitter, electrically connected to the energy converter and transmitting the light energy in a wireless manner; and
   an energy receiver, receiving the wireless energy in a wireless manner and converting the light energy into a second electric energy and comprises
      a transmitting end, transmitting an instruction signal to the energy transmitter, wherein the instruction signal comprises current charge status of an external apparatus and a displacement signal to adjust the position of the transmitter when received energy of the receiver is lower than a predetermined threshold, wherein the energy transmitter monitors the current charge status of the instruction signal so as to adjust transmitting the light energy.

2. The charge apparatus according to claim 1, wherein the energy transmitter is a light emitting device.

3. The charge apparatus according to claim 2, wherein the light emitting device is a light emitting diode (LED), an incandescent, a laser diode or a laser.

4. The charge apparatus according to claim 1, wherein the energy transmitter further transmits a microwave signal to locate the energy receiver.

5. The charge apparatus according to claim 1, wherein the energy transmitter comprises:
   a transmitting end, transmitting the light energy to the energy receiver in a wireless manner; and
   a receiving end, receiving an instruction signal from the energy receiver, wherein the instruction signal provides an energy transmission information to the energy transmitter.

6. The charge apparatus according to claim 5, wherein the energy transmission information is a current charge status of the external apparatus or a transmission path information.

7. The charge apparatus according to claim 5, wherein the energy receiver further comprises a controller, and the energy receiver transmits a displacement signal to the energy transmitter according to an operation result of the controller so as to allow the energy transmitter to adjust a position of the transmitting end.

8. The charge apparatus according to claim 1, wherein the energy receiver comprises:
   a receiving end, receiving the light energy from the energy transmitter.

9. The charge apparatus according to claim 8, wherein the energy transmission information is a current charge status of the external apparatus or a transmission path information.

10. The charge apparatus according to claim 1, wherein the energy receiver comprises a plurality of energy receivers, and the energy transmitter comprises an energy splitter for distributing the wireless energy to the energy receivers.

11. The charge apparatus according to claim 10, wherein the energy transmitter further comprises a controller, and the controller adjusts an energy distribution quantity of the energy splitter according to an instruction signal.

12. The charge apparatus according to claim 1, wherein the natural energy conversion module comprises a plurality of conversion units, and the conversion units are electrically connected with each other and convert the natural energy into the first electric energy.

13. The charge apparatus according to claim 1, wherein the natural energy conversion module comprises a plurality of conversion units, and the energy converter comprises a plurality of energy converters respectively corresponding to the conversion units.

14. The charge apparatus according to claim 1, wherein the energy transmitter comprises a position sensing apparatus for detecting a position of the energy receiver.

15. The charge apparatus according to claim 1, wherein the energy receiver comprises a positioning apparatus, wherein the positioning apparatus transmits a displacement signal to the energy transmitter to allow the energy transmitter to adjust a transmission direction of the wireless energy.

16. The charge apparatus according to claim 1, wherein the energy receiver is a photovoltaic semiconductor, a photodiode, a phototransistor or a photovoltaic cell.

17. The charge apparatus according to claim 1, the light emitting device is a GaAs visible laser, a GaAs invisible laser, a GaN visible laser, a GaN deep ultraviolet laser or an InP laser.

18. The charge apparatus according to claim 1, the light emitting device is a solid-state laser, a gas laser or a Laser diode.

19. The charge apparatus according to claim 3, wherein the laser device is a GaAs visible or invisible laser or a GaN visible or deep ultraviolet laser.

* * * * *